United States Patent
Zhang et al.

(10) Patent No.: US 10,439,241 B2
(45) Date of Patent: Oct. 8, 2019

(54) METHODS AND PROCESSES TO RECOVER THE VOLTAGE LOSS DUE TO ANODE CONTAMINATION

(71) Applicant: GM GLOBAL TECHNOLOGY OPERATIONS LLC, Detroit, MI (US)

(72) Inventors: Jingxin Zhang, Novi, MI (US); Paul Taichiang Yu, Pittsford, NY (US); Balasubramanian Lakshmanan, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 710 days.

(21) Appl. No.: 14/925,485

(22) Filed: Oct. 28, 2015

(65) Prior Publication Data

US 2017/0125828 A1  May 4, 2017

(51) Int. Cl.
*H01M 8/04* (2016.01)
*H01M 8/04955* (2016.01)
*H01M 8/04746* (2016.01)
*H01M 4/92* (2006.01)
*H01M 8/04303* (2016.01)

(52) U.S. Cl.
CPC ......... *H01M 8/04955* (2013.01); *H01M 4/92* (2013.01); *H01M 8/04303* (2016.02); *H01M 8/04753* (2013.01)

(58) Field of Classification Search
CPC ................... H01M 8/04955; H01M 8/04303
See application file for complete search history.

(56) References Cited

U.S. PATENT DOCUMENTS

| 2013/0017458 A1* | 1/2013 | Umeda | H01M 8/04231 429/410 |
| 2013/0224616 A1* | 8/2013 | Makino | H01M 8/04223 429/429 |

FOREIGN PATENT DOCUMENTS

CN          101048909 A      10/2007

* cited by examiner

*Primary Examiner* — Ula C Ruddock
*Assistant Examiner* — Frank A Chernow
(74) *Attorney, Agent, or Firm* — Reising Ethington P.C.

(57) ABSTRACT

A method for reducing fuel cell voltage loss in a fuel cell that includes an anode catalyst layer including an anode catalyst and a cathode catalyst layer including a cathode catalyst with a proton exchange layer interposed between the anode catalyst layer and the cathode catalyst layer. The method includes a step of initiating shutdown of the fuel cell. Carbon monoxide or carbon monoxide-like species contaminating the anode catalyst is oxidized during shutdown such that carbon monoxide or carbon monoxide-like species is removed from the anode catalyst.

6 Claims, 11 Drawing Sheets

METHODS AND PROCESSES TO RECOVER THE VOLTAGE LOSS DUE TO ANODE CONTAMINATION

TECHNICAL FIELD

In at least one embodiment, the present invention relates to methods for recovering anode voltage loss in a fuel cell.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane types of fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL") which, in turn, are sandwiched between a pair of electrically conductive elements or plates. The plates function as current collectors for the anode and the cathode, and contain appropriate channels and openings formed from a pair of, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

The low loaded Pt anode in PEM fuel cells is very susceptible to contamination by CO, or CO-like species, which impedes HOR kinetics and causes performance loss. For example, carbon monoxide contamination of the anode catalyst results in a fuel cell voltage drop. Currently there is no defined anode recovery procedure for fuel cell stack/module operation.

Accordingly, there is a need for anode recovery procedures to be built into fuel cell system operations to recover performance loss due to contamination of the anode electrode.

SUMMARY

The present invention solves one or more problems of the prior art by providing, in at least one embodiment, a method for reducing anode voltage loss in a fuel cell or stack of fuel cells. The fuel cell(s) include a proton exchange layer, an anode side including an anode catalyst layer, and a cathode side having a cathode catalyst layer, the anode catalyst layer including an anode catalyst and the cathode catalyst layer including a cathode catalyst. The proton exchange layer is interposed between the anode catalyst layer and the cathode catalyst layer. Diffusion layers and flow fields are positioned over each catalyst layer. Characteristically, the anode catalyst (i.e., platinum group metal) contained in the catalyst layers and in particular, the anode catalyst layer, is prone to a loss in voltage due to contamination. Typically, a plurality of such fuels cells are incorporated into a stack. The method of this embodiment includes a step of initiating shutdown of a fuel cell or a fuel cell stack including a plurality of fuel cells. Carbon monoxide or carbon monoxide-like contaminants in the fuel cell(s) is oxidized during shutdown such that the carbon monoxide is removed from the anode catalyst. Recovering anode voltage loss is not only beneficial to stack durability, but also to operation robustness and fuel efficiency.

In another embodiment, a fuel cell system that implements the methods set forth herein is provided. The fuel cell system includes a fuel cell stack including a plurality of fuel cells. Each fuel cell includes a proton exchange layer, an anode side including an anode catalyst layer, and a cathode side having a cathode catalyst layer. The anode catalyst layer includes an anode catalyst (e.g., platinum) and the cathode catalyst layer including a cathode catalyst (platinum group metal). The proton exchange layer is interposed between the anode catalyst layer and the cathode catalyst layer. The fuel cell system also includes a fuel cell controller that initiates shutdown of the fuel cells and oxidization of carbon monoxide or carbon monoxide-like contaminants disposed on the anode catalyst during shutdown such that the carbon monoxide is removed from the anode catalyst.

DETAILED DESCRIPTION

Figure 1:
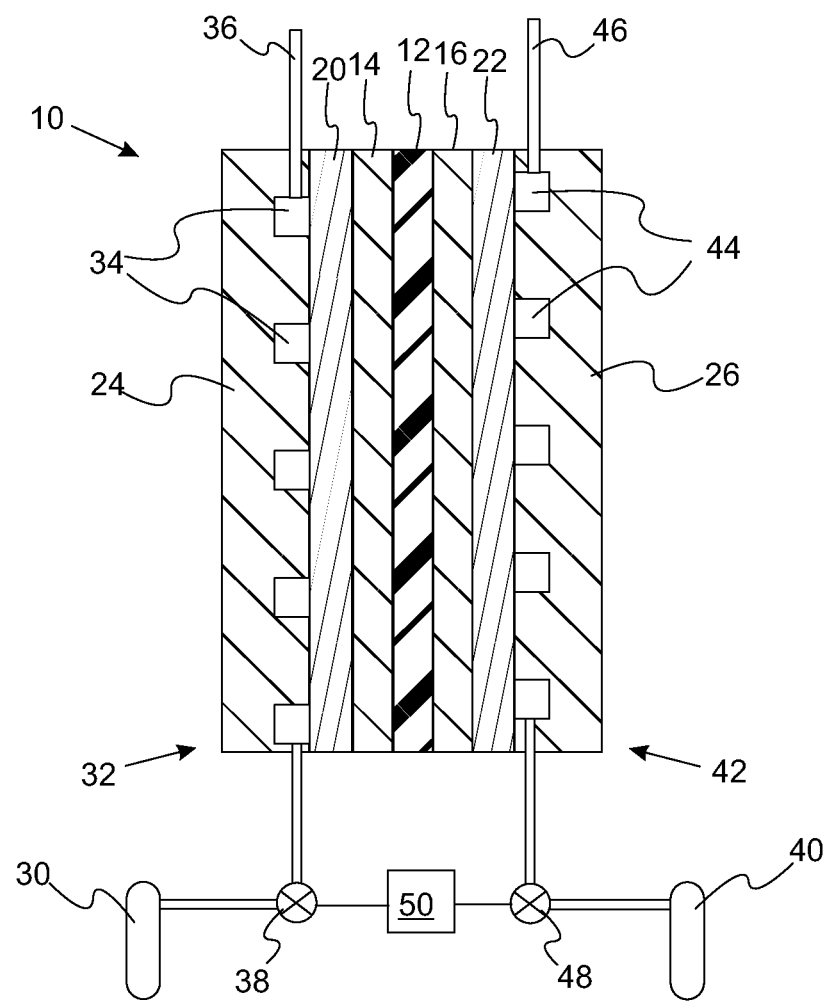
FIG. 1 is a schematic cross section of a proton exchange membrane fuel cell.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "standard electrode potential" means the electrical potential (i.e., the voltage developed) of a reversible electrode at standard state in which solutes are at an effective concentration of 1 mol/liter, the activity for each pure solid, pure liquid, or for water (solvent) is 1, the pressure of each gaseous reagent is 1 atm., and the temperature is 25° C. Standard electrode potentials are reduction potentials. In the context of the present invention, the term "oxidation potential" will be the electrical potential for a reaction run in the reverse direction to reactions that define the reduction potential. Therefore, the oxidation potential will be the negative of the reduction potential for reactions occurring under the same conditions.

With reference to FIG. 1, a schematic cross section of a proton exchange fuel cell is provided. The fuel cell of this design is known to be somewhat susceptible to contamination of its catalyst layers resulting in a loss of performance. Fuel cell 10 includes proton exchange layer 12 (e.g., a proton exchange membrane), anode catalyst layer 14, and cathode catalyst layer 16. The thickness of the anode and cathode catalyst layers is typically in the range of 1-50 μm. Collectively, proton exchange layer 12, anode catalyst layer 14, and cathode catalyst layer 16 are referred to as the membrane electrode assembly. Anode catalyst layer 14 and cathode layer 16 each independently include a platinum-group metal (e.g., platinum, ruthenium, rhodium, palladium, osmium, and iridium). Platinum is the most widely used catalyst in proton exchange fuel cells. In a refinement, the platinum-group metal is in the form of finely divided catalyst particles (e.g., Pt) supported on support particles such as carbon particles or metal oxide particles. In a further refinement, the catalyst particles have an average diameter from 1 nm to 100 nm and the support particles have an average diameter from 20 to 500 nm. Fuel cell 10 also includes gas diffusion layers 20 and 22. Anode flow field plate 24 is disposed over gas diffusion layer 20 and anode catalyst layer 14 and cathode flow field plate 26 is disposed over gas diffusion layer 22 and cathode catalyst layer 16. During operation, a fuel-containing gas from fuel source 30 is fed to the anode side 32. The fuel-containing gas flows through flow channel 34 formed in anode flow field plate 24 which are interconnected exiting through outlet 36. The flow of the fuel-containing gas is control by control valve 38. Typically, the fuel-containing gas includes molecular hydrogen as the fuel. Similarly, an oxygen-containing gas from oxygen source 40 is fed to the anode side 42 of the fuel cell. The oxygen-containing gas flows through flow channel 44 formed in cathode flow field plate 26 which are interconnected exiting through outlet 46. The flow of the oxygen-containing gas is controlled by control valve 48. Typically, the oxygen-containing gas (e.g., air) includes molecular oxygen. Control valves 38 and 48 are in electronic communication with fuel cell controller 50. On the anode side, the fuel is oxidized, while on the cathode side the oxygen is reduced. Proton generated on the anode side are transported to the cathode side through proton exchange layer 12. The overall reaction for the fuel cell when hydrogen is the fuel, is the sum of the anode half-cell reaction and the cathode half-cell reaction as provided by the following equation:

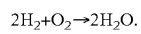

$$2H_2 + O_2 \rightarrow 2H_2O.$$

Figure 2:
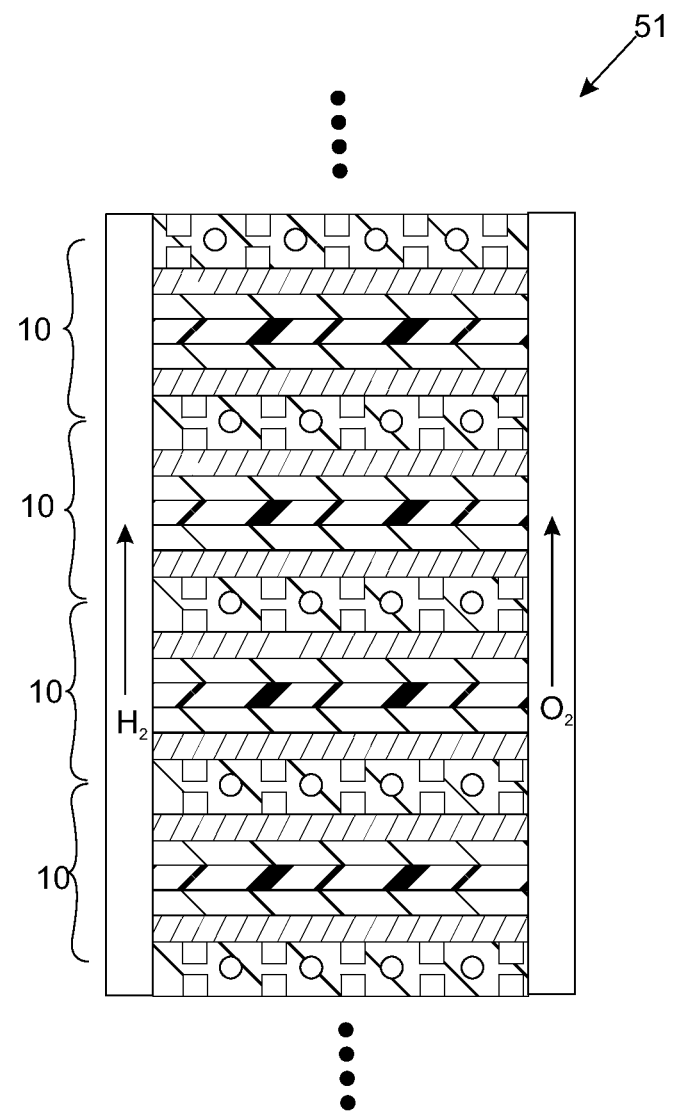
FIG. 2 is a schematic cross section of a stack of fuel cells having the design depicted in FIG. 1.

The reaction leads to a voltage between the anode and cathode with the cathode being more positive than the anode. FIG. 2 provides a schematic cross section showing a fuel cell stack having a plurality of fuel cells with the general design of FIG. 1. Specifically, the fuel cell stack includes a plurality of fuel cells 10. Although the present invention is not limited to any particular number of fuel cells in a fuel cell stack, typically a fuel cell stack includes from 4 to 400 fuel cells.

Figure 3:
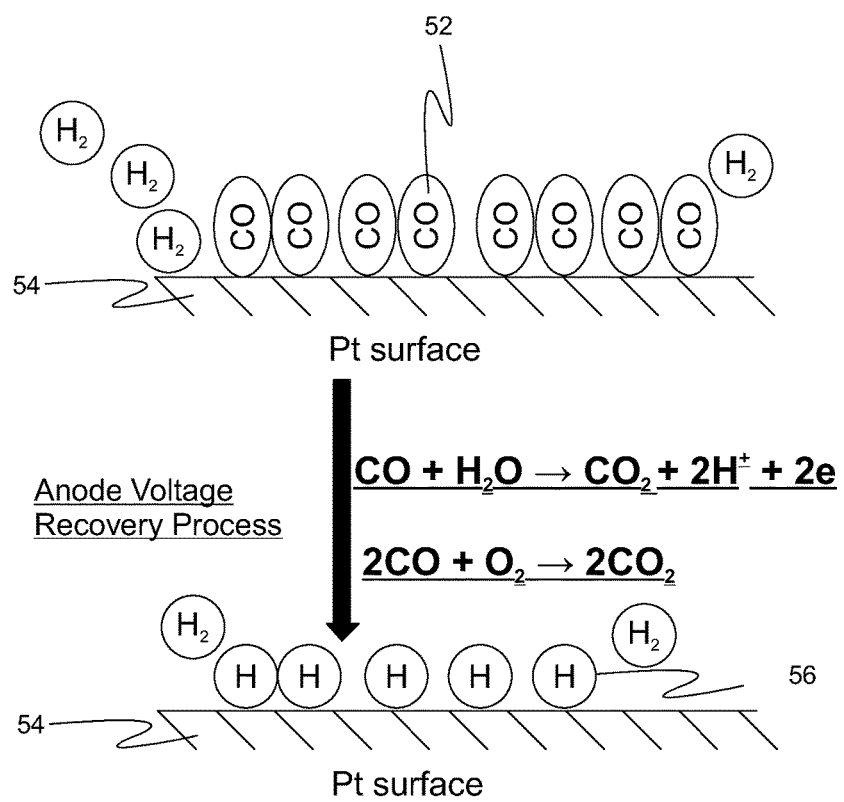
FIG. 3 is an illustration of carbon monoxide being oxidized to carbon dioxide by embodiments of the invention.

The methods for recovering cell voltage in a fuel cell set forth below operate to remove carbon monoxide or carbon monoxide-like species from the platinum-group metal, and in particular platinum, by oxidizing carbon monoxide to carbon dioxide as depicted in FIG. 3. In general, in accordance with the methods of set forth herein, carbon monoxide is oxidized by adjusting fuel cell reactant gas flows to the anode side and the cathode side such that the oxidation potential of the anode side achieves a voltage that oxidizes carbon monoxide, or molecular oxygen is present in the anode or on the anode Pt catalyst surface. As illustrated, carbon monoxide molecules 52 are adsorbed on platinum group metal surface 54. Oxidation of the carbon monoxide results in the carbon monoxide being oxidized and subsequently liberated from platinum surface 54. The removal of carbon monoxide allows hydrogen atoms 56 to more easily adsorb onto platinum group metal surface 54. Advantageously, the methods set forth herein are implemented during shutdown of the fuel cells in a fuel cell stack. In this context, "shutdown" refers to the process that culminates in the shutting off of the flow of the fuel-containing gas to the anode and the oxygen-containing gas to the cathode.

Figure 4:
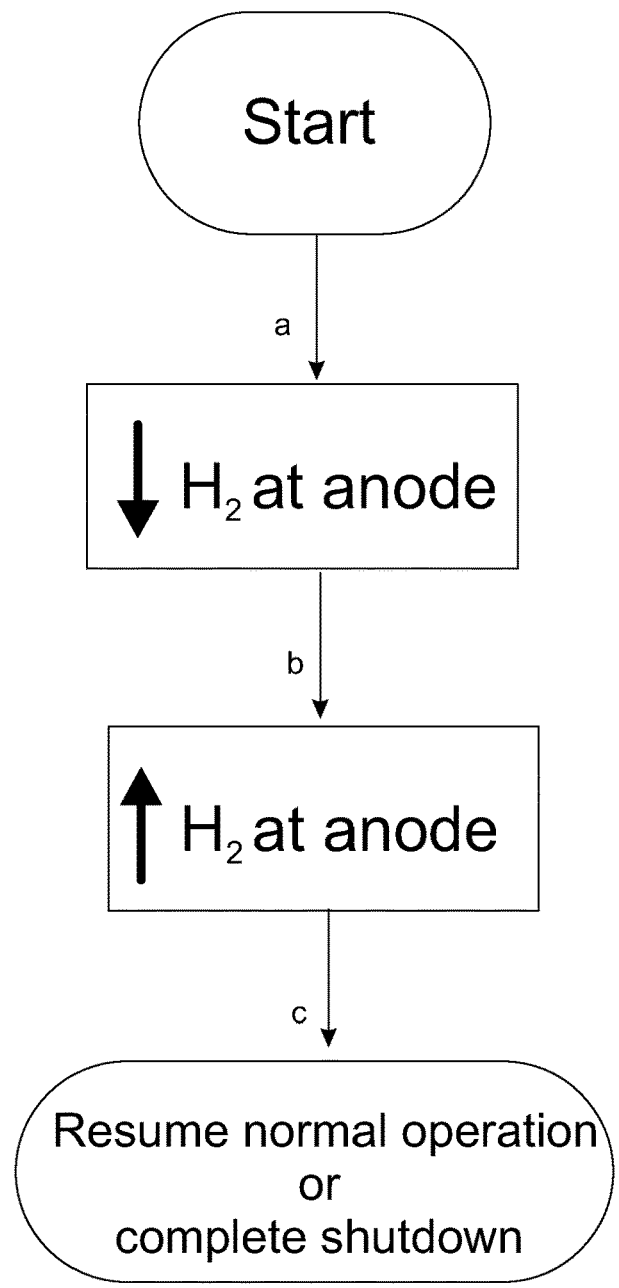
FIG. 4 is a flowchart depicting a method for increasing the anode potential and recovering cell voltage in a fuel cell by controlled starvation.
Figure 5:
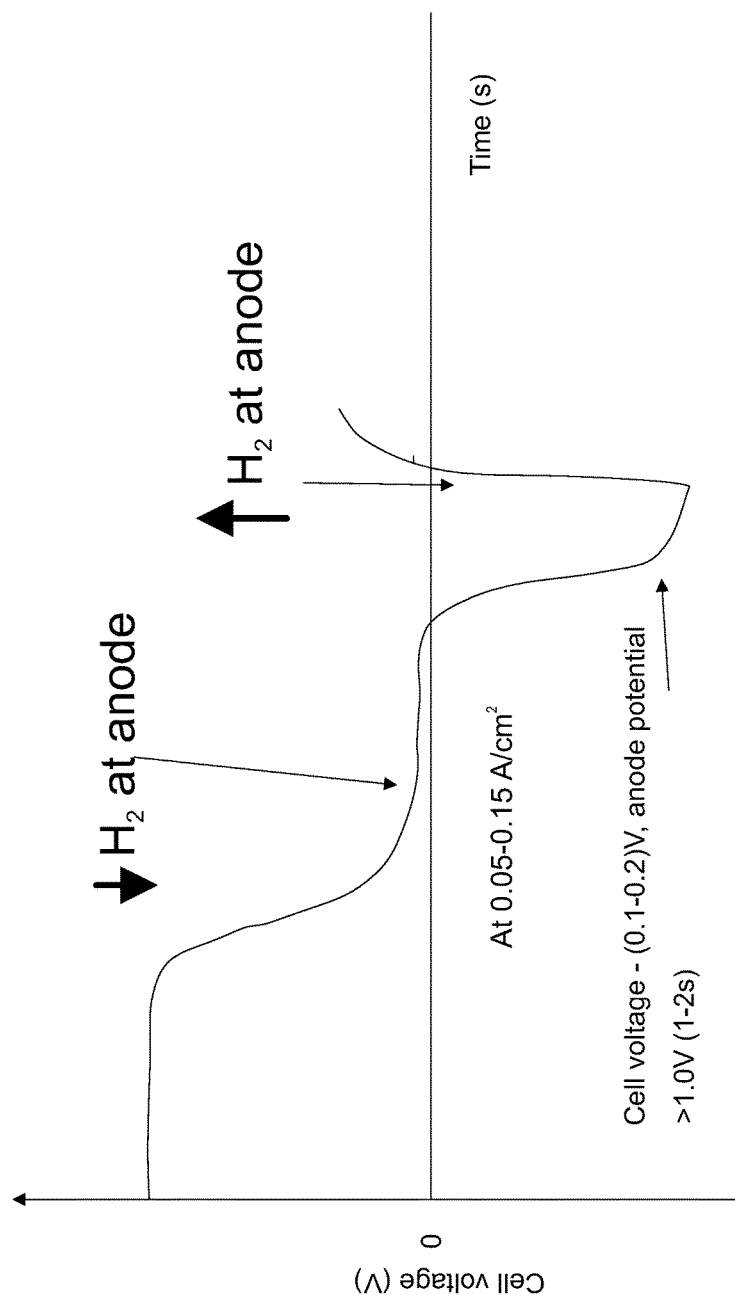
FIG. 5 is a plot of the fuel cell voltage as a function of time for the method of FIG. 4.

With reference to FIGS. 1, 4, and 5, a method for increasing the anode potential and recovering cell voltage in a fuel cell by controlled starvation is provided. FIG. 4 provides a flowchart depicting a method for increasing the anode potential and recovering cell voltage in a fuel cell by controlled starvation. FIG. 5 is a plot of the fuel cell voltage for this embodiment. In step a), Reduction of electrical load of the fuel cells in the fuel cell stack is initiated by fuel cell controller 50. In this step, the current density of the stack is first reduced, e.g., down to the range of 0.05 to 0.15 A/cm$^2$, then the amount of $H_2$ being fed to the anode is reduced such that the anode stoichiometry is below 1, i.e., the molar ratio of $H_2$ fed to anode to that required to generate the specified current is less than 1. In a variation, the amount of $H_2$ being fed to the anode is reduced such that the molar ratio of $H_2$ fed to anode to that required to generate the specified current is between 0.9 and 0.5. In one refinement, the hydrogen flow (i.e., liters/second) to the anode side is reduced to less than 50 percent of the flow that is normally used during operation of the fuel cell(s). In other refinements, the hydrogen flow to the anode side is reduced to less than, in increasing order of preference, 50 percent, 40 percent, 30 percent, 20 percent, 10 percent, or 5 percent of the flow that is normally used during operation of the fuel cell(s). In still another refinement, the hydrogen flow to the anode side is reduced to zero flow of hydrogen. In this step, fuel cell controller 50 sends a control signal to control valve 38 such that the flow of fuel-containing gas (e.g., a hydrogen-containing gas) is decreased over a first predetermined time period. In a refinement, the first predetermined time period is from 1 to 10 seconds. FIG. 5 shows that a drop in the fuel cell voltage occurs when the molar ratio of $H_2$ fed to anode to that required to generate the specified current is decreased. Since $H_2$ is under stoichiometric, the anode potential (that is the anode half reaction potential relative to a standard hydrogen electrode) is polarized to a potential (i.e., the oxidation potential) higher than about 1V while the overall fuel cell voltage is about −0.1 to −0.2 volts as depicted in FIG. 5. An anode potential higher than 0.85V is sufficient to oxidize CO electrochemically from the Pt surface. In step b), the hydrogen flow to the anode is reestablished for a second predetermined time period with the fuel cell voltage recovery as shown in FIG. 5. The second predetermined time is after the first predetermined time. In a refinement, the second predetermined time period is from about 1 to 10 seconds. In step c), the remaining steps of the shutdown are completed. Such remaining steps can include complete stoppage of flow, cooling of the fuel cell, and powering down of fuel cell electronics.

Figure 6:
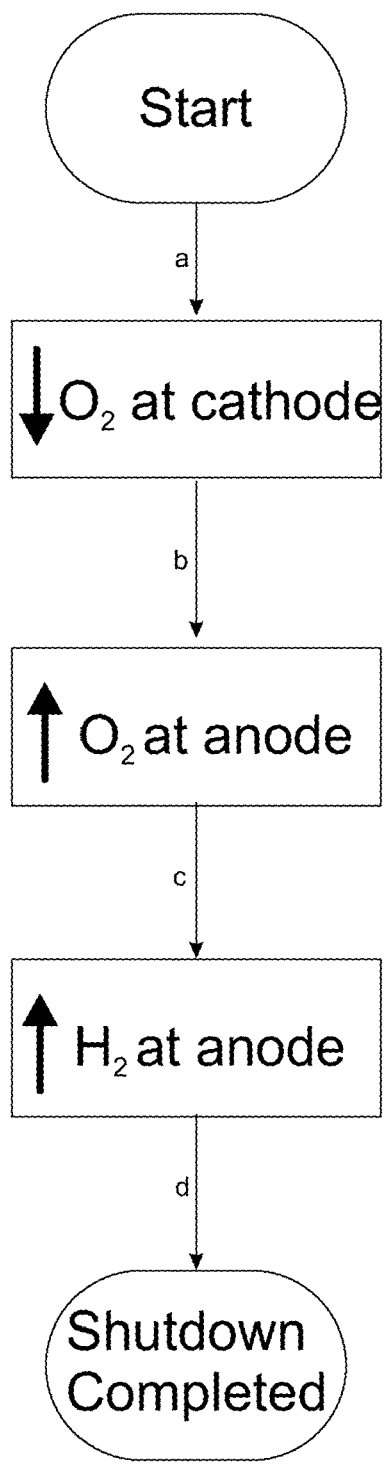
FIG. 6 is a flowchart depicting a method for introducing oxygen to anode and recovering cell voltage in a fuel cell by a controlled air flush at the initiation of fuel cell shutdown.
Figure 7:
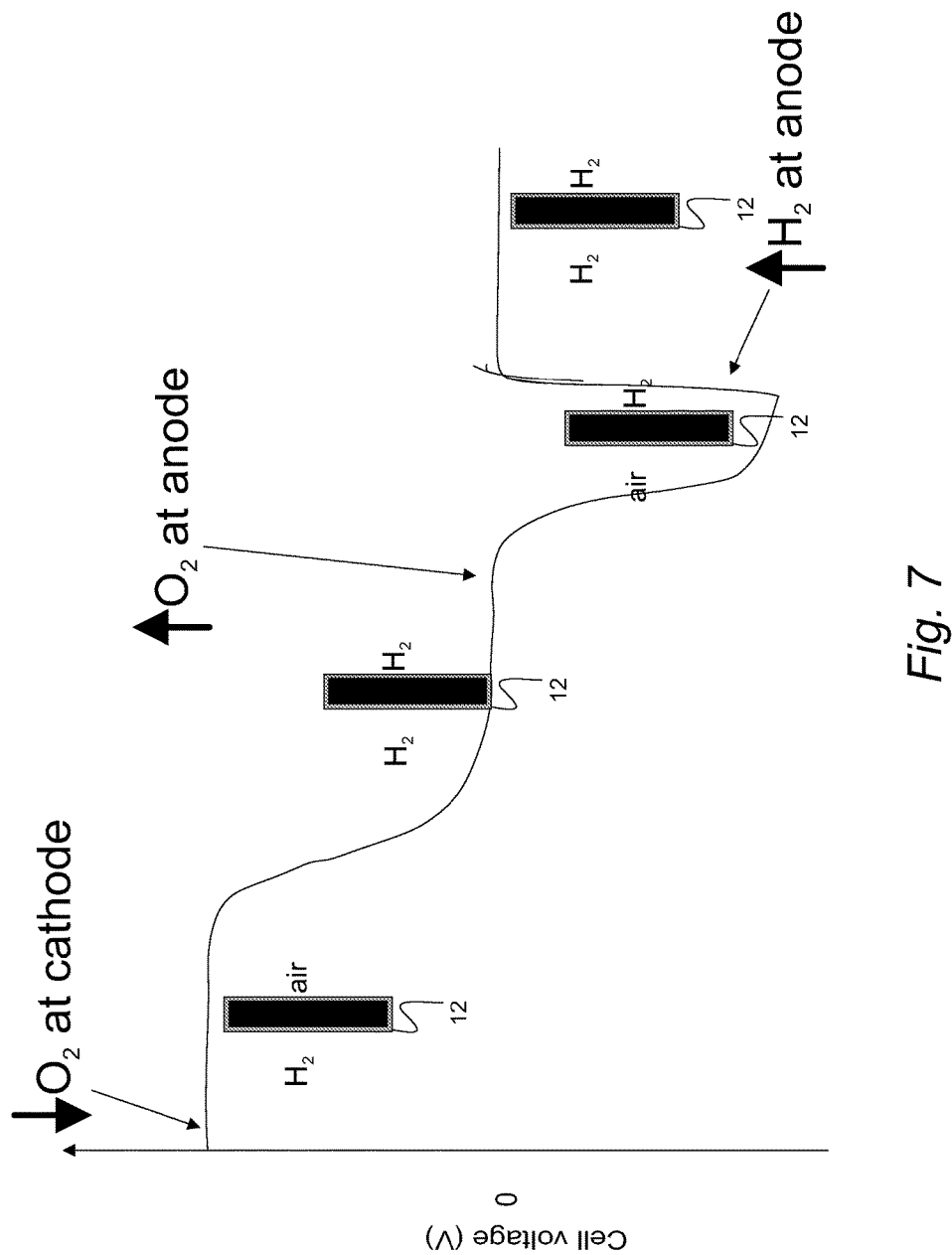
FIG. 7 is a plot of the fuel cell voltage as a function of time for the method of FIG. 6.

With reference to FIGS. 1, 6, and 7, a method for introducing oxygen to anode and recovering cell voltage in a fuel cell by a controlled oxygen-containing gas (e.g., air) flush is provided. With reference to FIG. 6, a flowchart depicting a method for introducing oxygen to anode and recovering cell voltage in a fuel cell by a controlled oxygen-containing gas (e.g., air) flush just prior to shutdown is provided. FIG. 7 provides a plot of the fuel cell voltage versus time for this embodiment. In step a), an $H_2$ take-over is initiated prior to shut down by stopping the cathode oxygen-containing gas (e.g., air) flow while drawing a load on the fuel cell over a first predetermined time period. In a refinement, the first predetermined time period is from 1 to 10 seconds. In another refinement, the first predetermined time period is substantially instantaneous. Eventually oxygen in the cathode is exhausted which results in a drop in fuel cell voltage as depicted in FIG. 7. FIG. 7 depicts hydrogen entering into the cathode side from the anode side due to the depletion of oxygen on the cathode side. In step b), oxygen-containing gas (e.g., air) is forced into the anode chamber of the fuel cell for a predetermined time period from oxygen source 40 which causes a drop in fuel cell voltage with a concurrent increase in the oxidation potential at the anode. The second predetermined time is after the first predetermined time. In a refinement, the second predetermined time period is from 0.1 to 10 seconds. Examples of oxygen source 40 include either valve to ambient air or a simple and low cost standalone air pump. Once the anode is exposed to oxygen, CO species are chemically oxidized due to anode potential being higher than about 0.85V. In step c), the anode chamber is flushed with hydrogen for a third predetermined time period to replace oxygen-containing gas (e.g., air) in the anode and the stack is back to a hydrogen soak condition (hydrogen on both sides of the proton conducting membrane 12) ready for the rest of the shutdown procedures. The third predetermined time period is after the second predetermined time period. In a refinement, each of the first, second and third predetermined time periods are independently from 0.1 to 10 seconds.

Figure 8:
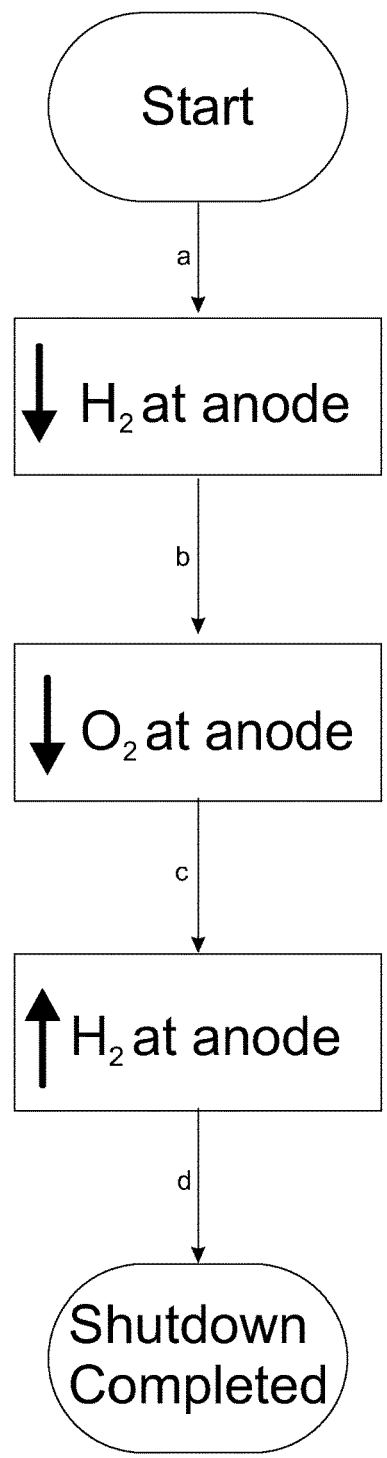
FIG. 8 is a flowchart depicting a method for introducing oxygen to the anode and recovering voltage in a fuel cell by a controlled oxygen crossover from cathode to anode at the initiation of fuel cell shutdown.
Figure 9:
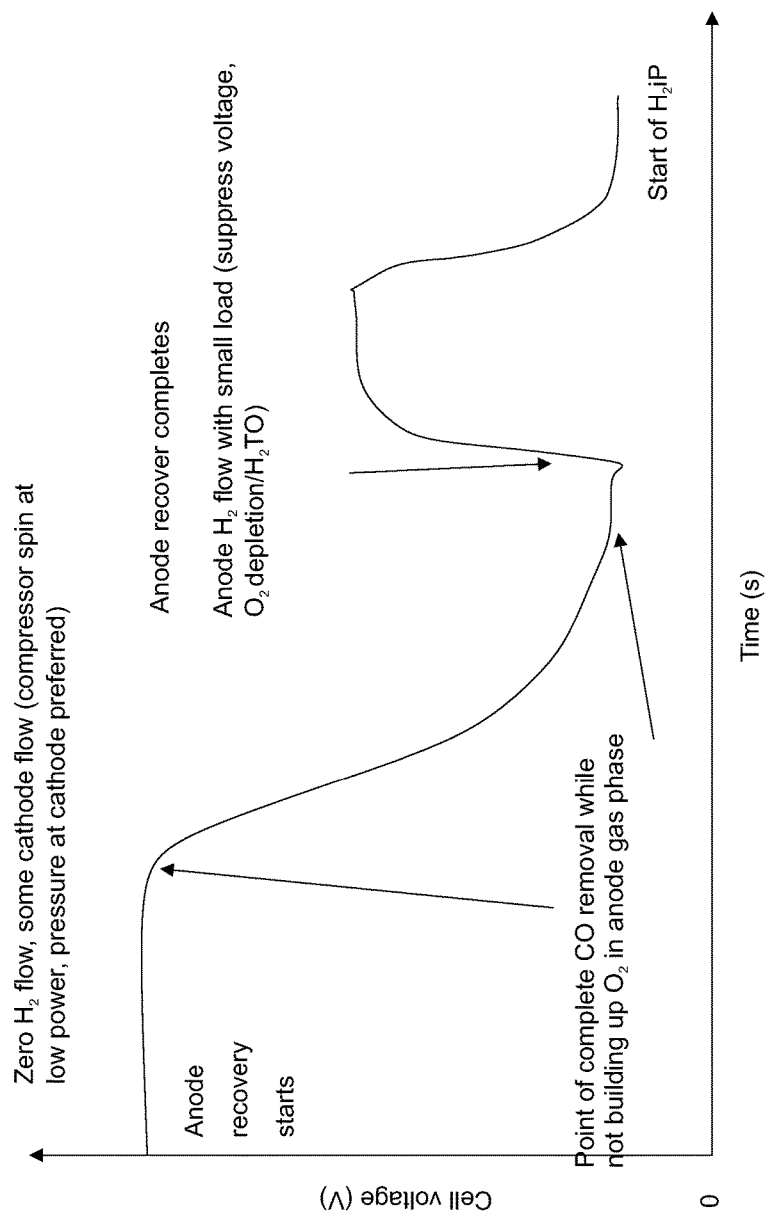
FIG. 9 is a plot of the fuel cell voltage as a function of time for the method of FIG. 8.

With reference to FIGS. 1, 8, and 9, a method for introducing oxygen to the anode and recovering voltage in a fuel cell by a controlled oxygen takeover is provided. With reference to FIG. 8, a flowchart depicting a method for introducing oxygen to the anode and recovering cell voltage in a fuel cell by a controlled oxygen takeover at the initiation of fuel cell shutdown is provided. FIG. 9 provides a plot of the fuel cell voltage versus time for this embodiment. In step a), shutdown is initiated with the flow of anode gases (e.g. fuel-containing gas such as hydrogen) being stopped for a first predetermined time period, while the flow of oxygen-containing gas to the cathode is maintained (e.g., minimum spin of the compressor) to maintain the cathode pressure. Oxygen in the cathode will permeate to the anode through the membrane. Some of the crossover oxygen reacts with CO or CO-like species on Pt surface, while the rest of the oxygen reacts with hydrogen. The cell voltage will eventually drop to less than 0.1V. In step b), the cathode oxygen-containing gas (e.g., air) flow is stopped over a second predetermined time period that follows the first predetermined time period. In step c), hydrogen flow to anode restored over a third predetermined time period that follows the second predetermined time period. In a refinement, each of the first, second and third predetermined time periods are independently from 1 to 400 seconds. In step d), the remaining steps of the shutdown process are initiated.

Figure 10:
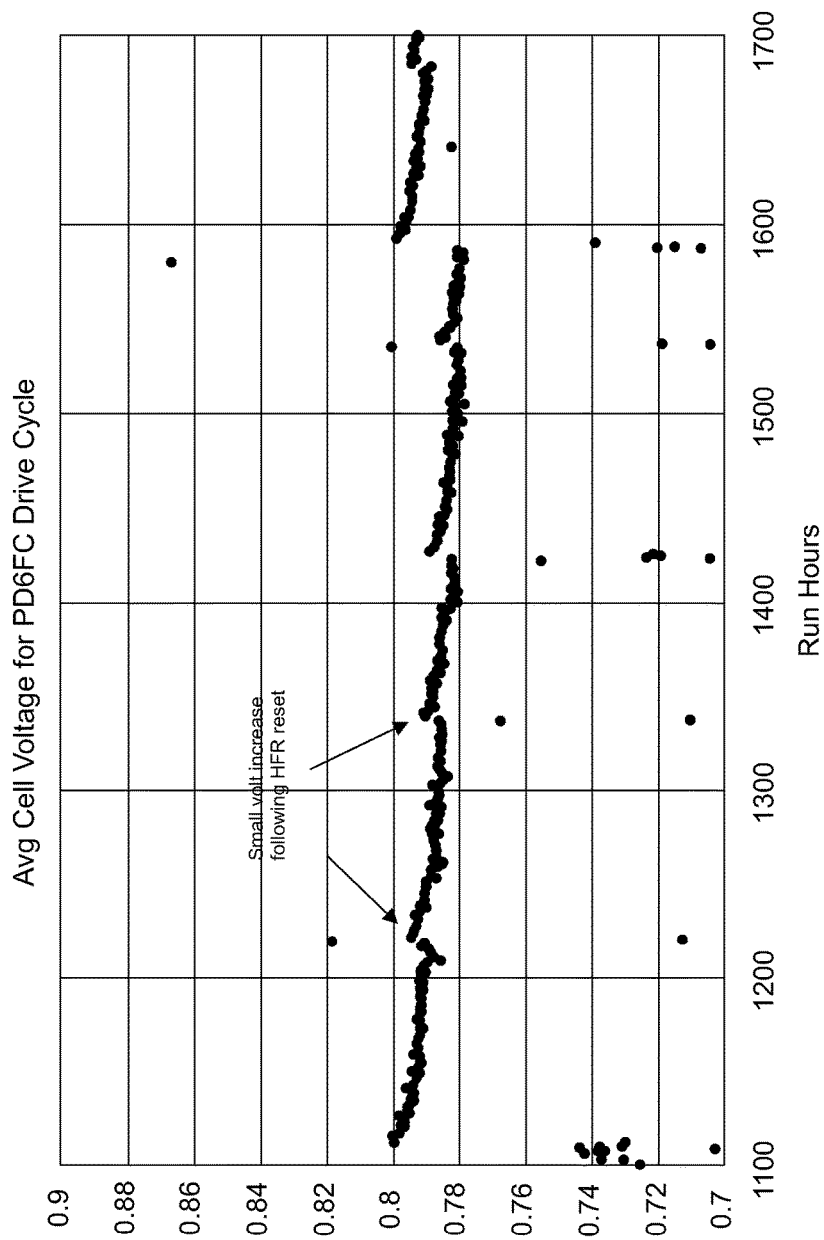
FIG. 10 is a plot of the cell voltage as a function of time for cycles of a forced cool down.
Figure 11:
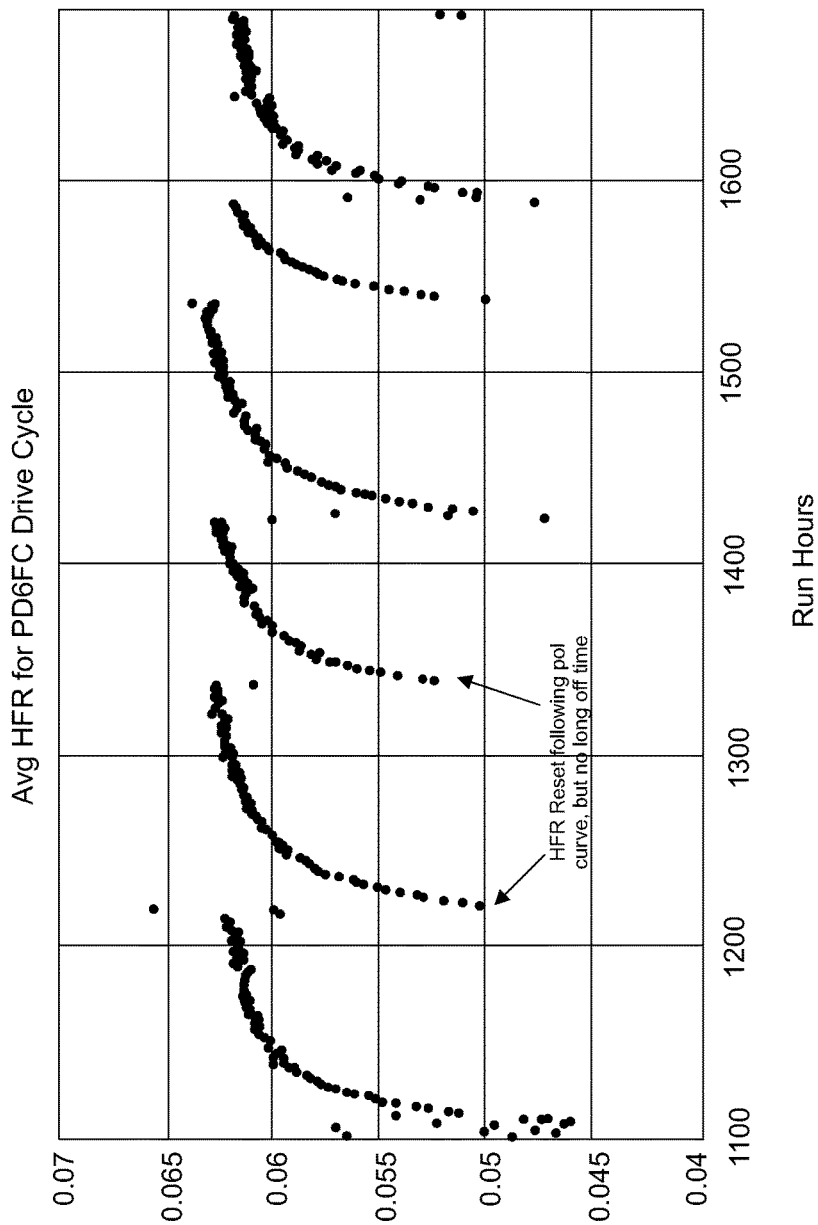
FIG. 11 is a plot of the high frequency (1 kHZ) resistance for the forced cool down cycles.

With reference to FIGS. 10 and 11, plots showing the effects of a forced cool down in which oxygen enters the anode side of a fuel cell are provided. In a forced cool down, coolant reduces the temperature of the fuel cell while the gas flows to the anode side and cathode side are stopped. The drop in temperature at the anode causes a drop in pressure thereby drawing air into the anode. FIG. 10 is a plot of the cell voltage as a function of time for cycles of a forced cooldown. FIG. 11 is a plot of the high frequency (1 kHZ) resistance for the forced cool down cycles. FIG. 10 shows that the cell voltage increase at the initiation of each cooling cycle while FIG. 11 show a precipitous drop in resistance at the initiation of each cooling cycle. This desirable effect is the result of carbon dioxide being oxidized and thereby being removed from the platinum in the anode catalyst layer.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for reducing anode voltage loss in a fuel cell, the method comprising:
    operating a fuel cell that includes a proton exchange layer, an anode side having an anode catalyst layer, and a cathode side having a cathode catalyst layer, the anode catalyst layer including an anode catalyst and the cathode catalyst layer including a cathode catalyst, the proton exchange layer being interposed between the anode catalyst layer and the cathode catalyst layer, and wherein operating the fuel cell includes flowing hydrogen to the anode side of the fuel cell and flowing oxygen-containing gas to the cathode side of the fuel cell;
    initiating shutdown of the fuel cell;
    stopping oxygen-containing gas flow to the cathode side of the fuel cell while drawing a load on the fuel cell for a first predetermined time period resulting in hydrogen from the anode side of the fuel cell entering the cathode side of the fuel cell as oxygen gas is depleted at the cathode side of the fuel cell;
    introducing oxygen-containing gas flow over a second predetermined time period into the anode side of the fuel cell to expose the anode side of the fuel cell to oxygen to thereby raise an anode potential of the fuel cell to greater than 0.85 V so that carbon monoxide disposed on the anode catalyst is oxidized and removed from the anode catalyst, the second predetermined time period following the first predetermined time period; and
    flushing the anode side of the fuel cell with hydrogen for a third predetermined time period that follows the second predetermined time period.

2. The method of claim 1 wherein the anode catalyst is a platinum group metal.

3. The method of claim 1 wherein the anode catalyst is platinum.

4. The method of claim 1 wherein the oxygen-containing gas is air.

5. A method for reducing anode voltage loss in a fuel cell, the method comprising:
    operating a fuel cell that includes a proton exchange layer, an anode side having an anode catalyst layer, and a cathode side having a cathode catalyst layer, the anode catalyst layer including an anode catalyst and the cathode catalyst layer including a cathode catalyst, the proton exchange layer being interposed between the anode catalyst layer and the cathode catalyst layer, and wherein operating the fuel cell includes flowing hydrogen to the anode side of the fuel cell and flowing oxygen-containing gas to the cathode side of the fuel cell;
    initiating shutdown of the fuel cell;
    stopping hydrogen flow to the anode side of the fuel cell for a first predetermined time period while maintaining oxygen-containing gas flow to the cathode side of the fuel cell so that oxygen crosses over from the cathode side of the fuel cell to the anode side of the fuel cell to thereby increase an anode potential to greater than 0.85 V so that carbon monoxide disposed on the anode catalyst is oxidized and removed from the anode catalyst;
    stopping oxygen-containing gas flow to the cathode side of the fuel cell for a second predetermined time period that follows the first predetermined time period; and
    reestablishing hydrogen flow to the anode side of the fuel cell for a third predetermined time period that follows the second predetermined time period.

6. A method for reducing cell voltage loss in a fuel cell, the method comprising:
    operating a fuel cell that includes a proton exchange layer, an anode side having an anode catalyst layer, and a cathode side having a cathode catalyst layer, the anode catalyst layer and the cathode catalyst layer each independently including platinum, the proton exchange layer being interposed between the anode catalyst layer and the cathode catalyst layer, and wherein operating the fuel cell includes flowing hydrogen to the anode side of the fuel cell and flowing air to the cathode side of the fuel cell;
    initiating shutdown of the fuel cell; and
    adjusting hydrogen flow or air flow to the fuel cell to reduce a voltage of the fuel cell and increase an anode potential of the fuel cell to greater than 0.85 V so that carbon monoxide disposed on the anode catalyst is oxidized and removed from the platinum in the anode catalyst;
    wherein adjusting hydrogen flow or air flow to the fuel cell to reduce the voltage of the fuel cell and increase the anode potential of the fuel cell to greater than 0.85 V comprises:
        stopping air flow to the cathode side of the fuel cell while drawing a load on the fuel cell over a first predetermined time period resulting in hydrogen from the anode side of the fuel cell entering the cathode side of the fuel cell as oxygen is depleted at the cathode side of the fuel cell;
        introducing air flow into the anode side of the fuel cell for a second predetermined time period to expose the anode side of the fuel cell to oxygen to thereby raise the anode potential to greater than 0.85 V, the second predetermined time period following the first predetermined time period; and
        flushing the anode side of the fuel cell with hydrogen for a third predetermined time period that follows the second predetermined time period; or
    wherein adjusting hydrogen flow or air flow to the fuel cell to reduce the voltage of the fuel cell and increase the anode potential of the fuel cell to greater than 0.85 V comprises:
        stopping hydrogen flow to the anode side of the fuel cell while maintaining air flow to the cathode side of the fuel cell so that oxygen crosses over from the cathode side of the fuel cell to the anode side of the fuel cell to thereby increase the anode potential to greater than 0.85 V;
        stopping air flow to the cathode side of the fuel cell; and
        reestablishing hydrogen flow to the anode side of the fuel cell.

* * * * *